United States Patent [19]
Fletcher et al

[11] 3,906,393
[45] Sept. 16, 1975

[54] ACOUSTICALLY CONTROLLED DISTRIBUTED FEEDBACK LASER

[76] Inventors: James C. Fletcher, Administrator of the National Aeronautics and Space Administration, with respect to an invention of Charles Elachi, Pasadena, Calif.

[22] Filed: June 28, 1973

[21] Appl. No.: 374,423

[52] U.S. Cl. ........ 331/94.5 C; 350/96 WG; 350/161
[51] Int. Cl.² ........................................... H01S 3/10
[58] Field of Search ...... 331/94.5; 350/96 WG, 160, 350/161; 330/4.3

[56] References Cited
UNITED STATES PATENTS
3,655,261  4/1972  Chang .............................. 331/94.5

OTHER PUBLICATIONS

Kogelnik et al., Stimulated Emission in a Periodic Structure, Appl. Phys. Let., Vol. 18, No. 4, (Feb. 15, 1971), pp. 152–154.

Pennington et al., Fast Tuning Distributed Feedback Laser, IBM Technical Disclosure Bulletin, Vol. 15, No. 8, (Jan. 1973), pp. 2631 and 2632.

*Primary Examiner*—William L. Sikes
*Attorney, Agent, or Firm*—Monte F. Mott; Paul F. McCaul; John R. Manning

[57] ABSTRACT

A distributed feedback laser that is capable of being continuously tuned and/or scanned is disclosed. The subject laser is further capable of being operated in a continuous wave mode as well as a pulsed mode. A lasing medium and an acoustic transducer are mounted on a substrate to have acoustic waves produce periodic mechanical distortions of the lasing medium to cause corresponding periodic disturbances of the index of refraction of said lasing material. Conventional means of excitation of the lasing medium such as by electron bombardment, laser illumination, of the application of electrical current may be used.

8 Claims, 8 Drawing Figures

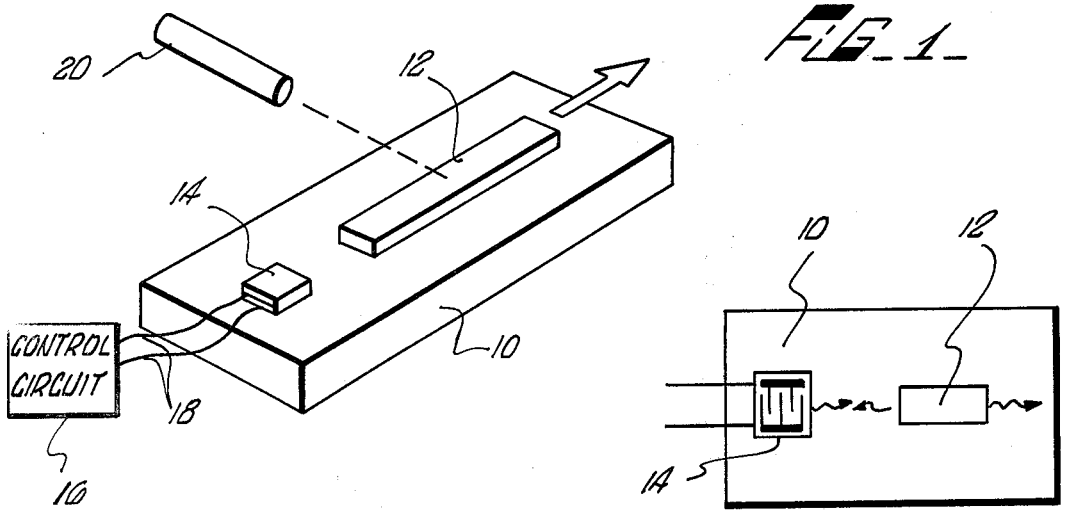
FIG_1_
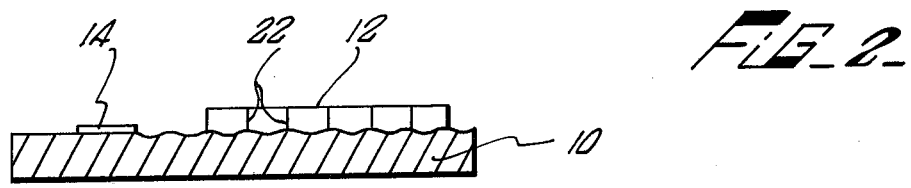
FIG_2_
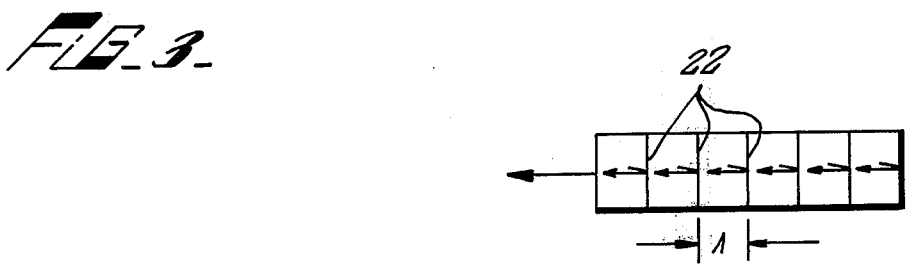
FIG_3_
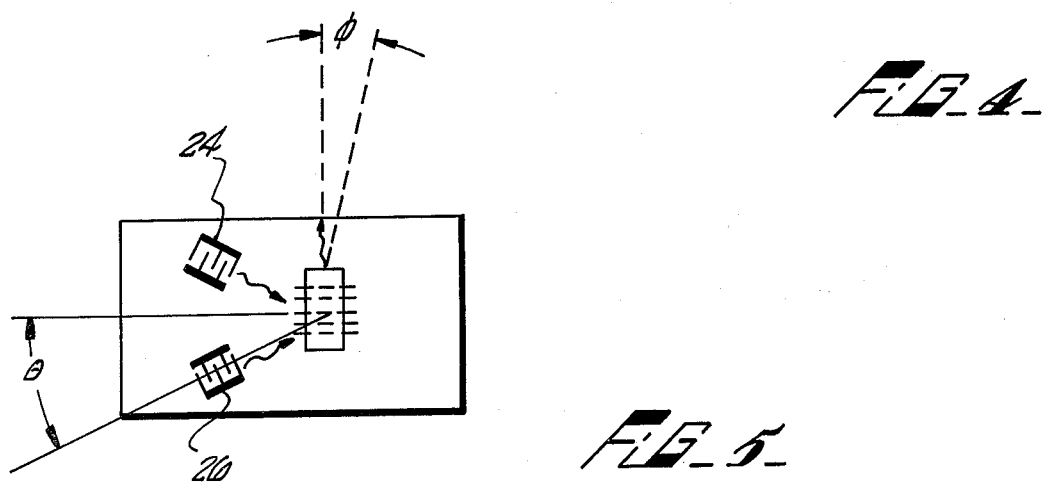
FIG_4_
FIG_5_

ACOUSTICALLY CONTROLLED DISTRIBUTED FEEDBACK LASER

BACKGROUND OF THE INVENTION

1. Origin of the Invention

The invention described herein was made in the performance of work under a NASA contract and is subject to the provisions of Section 305 of the Ntional Aeronautics and Space Act of 1958, Public Law 85-568 (72 Stat. 435; 42 U.S.C. 2457).

2. Field of the Invention

This invention generally relates to thin film, miniaturized optical systems. More particularly, the present invention concerns an acoustically controlled, distributed feedback laser formed by the use of thin film and/or integrated circuit techniques.

DESCRIPTION OF THE PRIOR ART

The advance of thin film and integrated circuit techniques has made possible the development of miniaturized laser devices. A category of such miniaturized lasers have become known as distributed feedback lasers.

Generally, such distributed feedback lasers are characterized by the creation of periodic disturbances in the lasing medium to cause additive reflection within the medium of generated laser energy. Such periodic disturbances are known to have been created in generally one of two manners. A first such manner is to focus two laser beams on the lasing medium to create an interference pattern in the lasing medium and thereby produce the necessary periodic disturbances necessary for distributed feedback. The second prior art technique is to groove or otherwise appropriately sculpt the lasing medium to physically create in the medium the properly spaced periodic disturbances.

Neither of the prior art techniques permits continuous tuning of the resulting laser with facility. For example, any tuning of the distributed feedback laser using two lasers to create an interference pattern requires mechanical movement or relocation of either or both of the laser devices to alter the interference pattern and hence the frequency for which the lasing medium is tuned. Obviously, a physically grooved lasing medium does not lend itself to being readily altered for the purpose of respacing such grooves to effectively change the tuning of the laser material.

OBJECTS AND SUMMARY OF THE INVENTION

Accordingly, it is an object of the present invention to provide a miniature laser that is capable of being continuously and easily tuned.

It is another object of the present invention to provide a miniature laser device wherein the laser beam may be easily physically scanned without requiring physical movement of the laser.

It is a yet further object of the present invention to provide a laser device in which generated laser energy may be directed in any of several different directions which may be easily selected without physical movement of the laser.

It is still a further object of the present invention to provide a miniature laser device that is capable of being operated in either a continuous wave mode or a pulsed mode.

It is still a further object of the present invention to provide an improved miniature laser device using thin film techniques which laser is capable of numerous practical applications by reason of being continuously tunable and scannable.

Briefly described, the present invention involves an acoustically controlled, miniaturized, distributed feedback laser.

More particularly, the subject laser includes a lasing medium mounted on a substrate in proximity to one or more acoustic transducers to be mechanically distorted by acoustic waves generated by said acoustic transducers such that periodic disturbances in the index of refraction of the lasing medium, and/or deformation of the interfaced surfaces of the lasing medium and substrate, are produced at periodic spatial intervals compatible with the frequency of laser energy generated upon excitation of the lasing medium.

The features that characterize the novelty of the present invention are set forth with particularity in the appended claims. Both the organization and the manner of operation of the invention, as well as the attendant advantages and further objects thereof, may be best understood by reference to the following detailed description taken in conjunction with the accompanying drawings wherein like reference symbols designate like parts throughout the figures thereof.

BRIEF DESCRIPTION OF THE DRAWINGS

FIG. 1 is a schematic diagram illustrating a perspective view of the primary components of an acoustically controlled, distributed feedback laser in accordance with the present invention.

FIG. 2 is a schematic diagram illustrating a top view of the distributed feedback laser shown in FIG. 1.

FIG. 3 is a schematic diagram illustrating a side view of the distributed feedback laser shown on FIGS. 1 and 2.

FIG. 4 is a graphic diagram that is useful in understanding the operation of distributed feedback lasers.

FIG. 5 is a schematic diagram illustrating a top view of an alternate embodiment of the present invention wherein a pair of acoustic transducers are employed to produce desired periodic mechanical distortions.

DETAILED DESCRIPTION OF A PREFERRED EMBODIMENT

Figure 6:
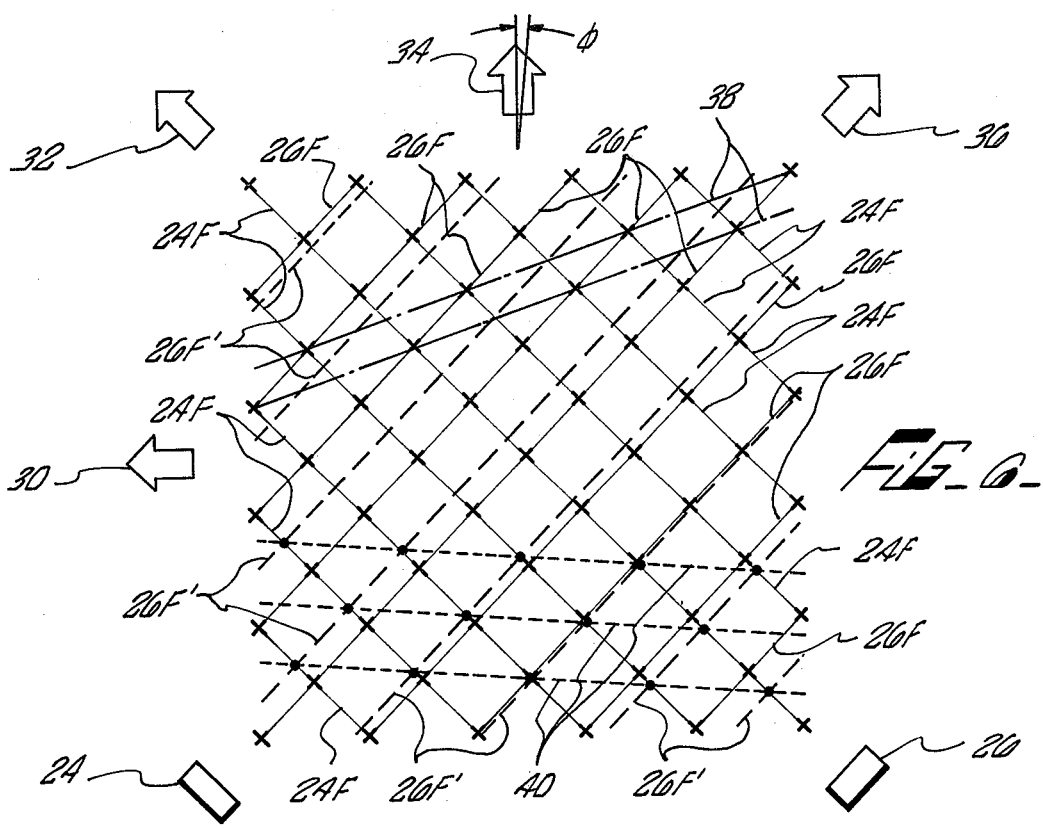
FIG. 6 is a graphic diagram that is helpful in understanding the means by which acoustic waves generated by a pair of acoustical transducers are mixed to produce an interference pattern and resulting periodic disturbances in accordance with the present invention.
Figure 7:
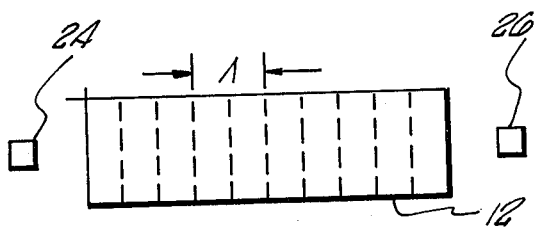
FIG. 7 is a schematic diagram illustrating a top view of a lasing medium at the ends of which are situated acoustic transducers in accordance with a further embodiment of the present invention wherein a pulsed mode of operation is accomplished.

Referring to FIGS. 1, 2 and 3 of the drawings, an acoustically controlled, distributed feedback laser in accordance with the present invention essentially includes a substrate 10 on a surface of which a laser medium 12 and an acoustic transducer 14 are mounted using conventional thin film and/or integrated circuit techniques as may be appropriate. A control circuit 16 of conventional design is connected via a pair of appropriate electrical conductors 18 to the transducer 14 for the purpose of controlling the frequency of the acoustic signals generated thereby. A laser source 20 or other appropriate source of excitation energy may be situated with respect to the lasing medium 12 to produce lasing as is later discussed in greater detail hereinafter.

The substrate 10 may be any conventional semiconductor material, i.e., n-type or p-type material. Glass may also be used as the substrate material.

The lasing medium 12 may also be a semiconductor that is appropriately doped, as necessary, to provide laser energy of a selected wavelength. An example of an appropriate semi-conductive lasing medium would be neodymium doped silicon, gallium arsenide, lead telluride, etc. As an alternative, the lasing medium 12 may be formed by the use of a dye material of conventional type. Such dye material is conventionally known to be basically gelatin that is doped with a dye that will produce lasing when appropriately excited such as by the application of laser energy from another appropriately situated laser.

The lasing medium 12 may be deposited or fixed in any suitable manner to the surface substrate 10. Typically, dimensions for a suitable lasing medium 12 would be a length of 1 millimeter to 1 centimeter, a thickness of 2 to 3 microns and a width that is compatible with the width of acoustic transducers that may be employed. Typically, both the acoustic transducer 14 and the lasing medium 12 may have a width of 0.1 to 1 millimeter.

The acoustic transducer 14 may be of a conventional type which is formed on the surface of the substrate 10 in proximity to the lasing medium 12 by the use of any well known thin film technique such as vapor deposition or the like. The acoustic transducer 14 is typically very, very thin and may take the physical configuration of combs having interleaved teeth as is well known and as is generally illustrated by FIGS. 2 and 3.

The conductors 18 which serve to permit a control circuit 16 to be connected to the transducer 14 may similarly be vapor deposited, printed, etc., on the surface of the substrate 10.

The control circuit 16 may be any conventional circuit by which the frequency of the acoustic waves generated by the transducer 14 can be continually controlled. For example, a weak source of drive voltage may be used.

Referring particularly to FIG. 3, it is graphically shown how the acoustic wave generated by the transducer 14 is propagated along the surface of the substrate 10 and between the lasing medium 12 and the substrate 10. The propagation of the acoustic energy between the abutting surfaces of the substrate 10 and the lasing medium 12 causes mechanical disturbances of the index of refraction of the lasing medium 12, and deformation of the interfaced surfaces of the lasing medium 12 and the substrate 10, are produced by the mechanical stress that is created by the mechanical distortions. Very small changes in refractive index and/or film thickness are sufficient to generate oscillation in the lasing medium in accordance with the invention. For example, refractive index changes of $10^{-4}$ to $10^{-5}$ which correspond to a film thickness periodicity of about 10 A is sufficient for the purpose of this invention.

As is well known, the resulting periodically occurring areas of changed refractive index or film thickness will serve to cause accumulative or additive internal reflection of laser energy within the lasing medium 12 when such areas of increased index of refraction form generally parallel lineal fringes 22 that are spaced at intervals of one-half the wavelength of the generated laser energy. As shown in FIG. 4, the laser energy may be directed out the ends of the lasing medium 12 by having such periodically occurring lineal fringes 22 excited transversely to the longitudinal axis of the lasing medium 12. More generally, the generated laser energy will be directed in a direction that is perpendicular to the lineal fringes which are assumed to be straight lines and hence parallel. Energy reflected at each of the lineal fringes 22 in a common direction are additive.

Tuning of a distributed feedback laser in accordance with the present invention simply requires that the frequency of the acoustic energy be controlled to vary the distance between the fringes of increased refractive index and/or surface perturbation to be one-half the wavelength of the frequency of desired laser energy. It is of course noted that the frequency of generated laser energy is chiefly dependent on the lasing medium 12. Acoustic control of the laser frequency may thus be simply accomplished in accordance with the relationship $2\Lambda = n\lambda$ where $\Lambda$ is the wavelength of acoustic energy, $\lambda$ is the wavelength of optical or laser energy, and n is any integer.

It is to be noted that laser energy may be exited from either or both ends of the lasing medium 12. However, this is considered to present no serious detriment to the invention as a whole as such laser energy is useable at one end of the lasing medium as at the other. A prism, mirror, or other suitable optical system and/or utilization apparatus that is well known in the prior art may be used to couple the laser energy from the lasing medium towards a desired target or objective.

Referring to FIGS. 5 and 6, it may be observed that a pair of acoustic transducers 24 and 26 may be used to produce an interference pattern and thereby create a resultant pattern of mechanical distortion of the lasing medium in conformance with the interference pattern. Typically, the transducers 24 and 26 would be used to generate acoustic frequencies that are identical. As shown by FIG. 6, the acoustic energy generated by the transducer 24 will create parallel lineal fringes in a well known manner and as represented by the parallel lines 24F. Similarly, the acoustic energy generated by the transducer 26 will produce a pattern of lineal fringes of increased refractive index as represented by the parallel lines 26F. At the points where the two lineal fringes 24F and 26F cross, spot perturbations 28 of increased refractive index and/or film thickness are created. It may be readily observed that such spot perturbations 28 form a geometrical grid pattern of imaginary lines which generally extend in the example of FIG. 6, parallel to a line representing the geometric resultant (i.e., along the length of the sheet of drawings) of the lines representing the lineal fringes 24F and 26F when combined, and parallel to a line that is perpendicular to such resultant direction (i.e., across the sheet of drawings). It is clear that if a laser having a specific wavelength is desired, the frequency of the transducers 24 and 26 need only be mutually adjusted to have the distance between the imaginary lines of spot perturbations equal the necessary one-half wavelength distance as earlier explained. Varying the frequencies of both the transducers 24 and 26 accordingly permits laser energy to be directed in any of the several directions illustrated by the arrows 30, 32, 34 and 36. For example, where laser energy having a wavelength λ is desired to be directed in the direction of the arrow 36, the frequency of the transducer 24 would be adjusted to have a wavelength $n\lambda/2$ while the transducer 24 is maintained in an ambient or non-operational condition. The roles of the transducers 24 and 26 may be reversed to have laser energy having a wavelength λ directed in the direction indicated by the arrow 32. Finally, as earlier mentioned, the transducers 24 and 26 may both be operated at a frequency necessary to have imaginary lines extending across the sheet of drawings, as formed by the pattern of spot perturbations, occur at intervals equal to one-half the wavelength λ of the desired laser energy.

It is to be noted that the closer the spot perturbations are along the imaginary line, the higher will be the efficiency of the desired internal reflections since a lesser amount of laser energy will be permitted to be transmitted through the lasing medium without being reflected and hence being involved with the amplifying distributed feedback process. The efficiency of a laser may also be improved by generating spot perturbations of greater strength. It is also to be noted that the imaginary lines that have been referred to are the primary imaginary lines that are formed. It is clear that other secondary patterns of parallel lines are concurrently formed by non-adjacent spots as is illustrated by lines 38 shown in FIG. 6.

It has been assumed in the preceding discussion that acoustic waves having identical frequencies are transmitted by the respective transducers 24 and 26. In the event that the frequency of one of the transducers is changed, the imaginary lines formed by the spot perturbations 28 are reoriented. Referring to FIG. 6, if the frequency of the transducer 26 is decreased, the distance between lineal fringes produced thereby is increased as illustrated by the lines 26F'. The resulting spot perturbations are hence reoriented and the resulting imaginary lines 40 may be observed as being slightly tilted towards the right side of the sheet of drawings rather than extending directly across the sheet. Increasing the frequency of the acoustic wave generated by the transducer 26 would of course cause the imaginary lines 38 to be tilted slightly to the left of the sheet of drawings. Corresponding complementary changes of the frequency of the transducer 24 would also produce the results above described.

Accordingly, the subject invention thus permits a scanning of any laser beam through an angle φ by simply making controlled changes in the frequency of one of the two transducers 24 and 26 since such laser energy will be directed generally perpendicularly to the parallel lineal lines formed by the imaginary lines of spot perturbations.

To summarize the system of FIG. 5, two acoustic waves interfere to generate standing fringes in a resultant direction leading to lasing in such direction at a wavelength $\lambda = m\Lambda/n \sin\theta$, where $m$ is the index of refraction, and $\theta$ is one-half the angle formed between the respective acoustic transducers 24 and 26. Lasing may also be directed in a number of other directions at different wavelengths because of the two dimensional periodicity. The laser can be tuned by changing $\theta$ or, in accordance with the present invention, the acoustic frequency of both transducers. The laser beam direction can be controlled by changing the frequency of only one acoustic transducer. It can be easily shown that the change in the beam direction is linearly related to the change of the acoustic frequency for small frequency changes. Therefore by applying a frequency coded acoustic signal, the beam can be scanned in a specific predictable manner since each direction of the beam corresponds to a specific lasing frequency. If the same lasing frequency is required for all directions, the two acoustic frequencies need only be changed simultaneously in a specific manner.

Figure 8:
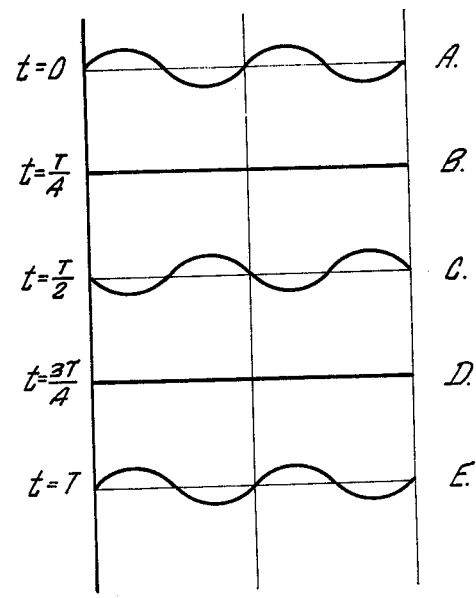
FIG. 8 is a graphic diagram illustrating a series of waveforms which are useful in understanding the means by which a pulsed mode of operation is produced by the embodiment illustrated by FIG. 8.

The laser devices heretofore described would be operated in a continuous wave mode. A pulsed mode of operation can be effected in accordance with the present invention by situating the transducers 24 and 26 at opposite ends of a lasing medium 12 to allow the oppositely directed acoustic waves to naturally produce a standing wave between the lasing medium 12 and the substrate 10. As is well known, and as is illustrated by FIG. 8, such standing wave will occur only at periodic time intervals. As shown by waveforms A, C and E of FIG. 8, a standing wave pattern will be created by the oppositely traveling acoustic waves as they pass each other and alternately become in-phase and out-of-phase. As is well known, no standing wave pattern exists during interim time periods as shown by the waveforms B and D of FIG. 8. Characteristically, twice as many lineal fringes of increased index of refraction will be produced per unit of distance by a standing wave pattern than would be produced if a single running wave of a single transducer were used in the earlier described manner. Accordingly, the relationship between the wavelengths of the acoustic energy and laser energy is slightly modified to be:

$$\lambda = n\Lambda$$

From the foregoing discussion, it is now understood that an acoustically controlled distributed feedback laser is provided in accordance with the present invention wherein either pulsed or continuous wave modes of operation are available and wherein scanning or redirection of the generated laser beam may be readily accomplished by controlled variation of the frequency of acoustic waves.

It is to be understood that any appropriate well known technique may be used to excite the lasing medium 12 to produce lasing. For example, electron bombardment, electrical current, or light energy may be used to excite a semiconductor lasing medium 12 in any conventional manner that is well known in the prior art. In the interest of conciseness, a detailed description of such excitation techniques and apparatuses are omitted herefrom.

While a preferred embodiment of the present invention has been described hereinabove, it is intended that all matter contained in the above description and shown in the accompanying drawings be interpreted as illustrative and not in a limiting sense and that all modifications, constructions and arrangements which fall within the scope and spirit of the invention may be made.

What is claimed:

1. A distributed feedback laser including:
    a substrate having a planar surface;
    a lasing medium mounted on said planar surface of said substrate;
    acoustic means positioned on said planar surface of said substrate in proximity to said lasing medium for providing acoustic energy that is propagated between the abutting surfaces of said lasing medium and said substrate to produce mechanical distortion of said lasing medium said acoustic means including a pair of acoustic transducers positioned to have the acoustic waves generated thereby cross-directed to form an interference pattern wherein said interference pattern produces mechanical distortion of said lasing medium; and means for applying excitation energy to said lasing medium to produce lasing.

2. The distributed feedback laser defined by claim 1 further including means for controlling the frequency of the acoustic waves generated by each of said acoustic transducers.

3. The distributed feedback laser defined by claim 1, wherein said pair of acoustic transducers are positioned on opposite sides of said lasing medium to have a standing wave pattern created between said lasing medium and said substrate, said standing wave pattern producing said mechanical distortions of said lasing medium.

4. A distributed feedback laser having a pulsed mode of operation, said laser comprising:

a substrate;

a lasing medium mounted on said substrate;

acoustic means including a pair of acoustic transducers positioned on opposite sides of said lasing medium for having the acoustic waves generated thereby oppositely directed for periodically creating an acoustic standing wave pattern between said substrate and said lasing medium to cause periodic mechanical distortion of said lasing medium wherein said periodic mechanical distortion periodically produces spatially regular areas of said lasing material having an increased index of refraction; and means for applying excitation energy to said lasing medium to produce lasing.

5. The distributed feedback laser defined by claim 4 further including:

means for controlling the frequency of the acoustic waves generated by said acoustic means to vary the frequency of said laser beam and the repetition rate of pulses of laser energy provided by said laser, said repetition rate being increased as the frequency of said acoustic energy is increased.

6. The distributed feedback laser defined by claim 5, wherein the acoustic waves generated by said acoustic means have identical frequencies.

7. A distributed feedback laser comprising:

a substrate;

a lasing medium mounted on said substrate;

acoustic means for providing acoustic energy that is propagated between said substrate and said lasing medium along an abutting surface thereof, said acoustic energy causing distortion of said lasing material to create areas thereof having an increased index of refraction, said acoustic means including a pair of acoustic transducers positioned to have the acoustic waves generated thereby cross-directed to form an interference pattern wherein said interference pattern produces mechanical distortion of said lasing medium;

means for controlling the frequency of said acoustic energy provided by said acoustic means; and means for applying excitation energy to said lasing medium.

8. A distributed feedback laser comprising:

a substrate;

a lasing medium mounted on said substrate;

acoustic means for providing acoustic energy that is propagated between said substrate and said lasing medium along an abutting surface thereof, said acoustic energy causing mechanical distortion of said lasing material to create areas thereof having an increased index of refraction, said acoustic means including a pair of acoustic transducers positioned on opposite sides of said lasing medium to have the acoustic waves generated thereby oppositely directed for periodically producing a standing wave pattern between said lasing medium and said substrate, said standing wave pattern producing said mechanical distortion of said lasing medium;

means for controlling the frequency of said acoustic energy provided by said acoustic means; and means for applying excitation energy to said lasing medium.

* * * * *